United States Patent [19]

Menon et al.

[11] Patent Number: 5,560,817

[45] Date of Patent: Oct. 1, 1996

[54] HYDROCARBON CATALYTIC CRACKING PROCESS

[75] Inventors: Raghu K. Menon, Medford; Ramakrishnan Ramachandran, Allendale, both of N.J.

[73] Assignee: The BOC Group, Inc., New Providence, N.J.

[21] Appl. No.: 315,634

[22] Filed: Sep. 30, 1994

[51] Int. Cl.$^6$ .......................... C10G 11/18; C07C 7/12; B01J 38/14

[52] U.S. Cl. .......................... 208/113; 208/99; 585/820; 502/39; 502/52

[58] Field of Search .......................... 208/113, 91, 93, 208/95, 100, 101, 103, 99; 585/820, 826, 829, 830; 502/52, 38, 39

[56] References Cited

U.S. PATENT DOCUMENTS

| | | | |
|---|---|---|---|
| 4,542,114 | 9/1985 | Hegarty | 502/39 |
| 5,185,139 | 2/1993 | Krishnamurthy et al. | 423/359 |
| 5,245,099 | 9/1993 | Mitariten | 585/650 |

*Primary Examiner*—Asok Pal
*Assistant Examiner*—Bekir L. Yildirim
*Attorney, Agent, or Firm*—Coleman R. Reap; Larry R. Cassett

[57] ABSTRACT

Hydrocarbon fluid catalytic cracking (FCC) plants are debottlenecked by replacing air feed to the cracking catalyst regenerator with oxygen and carbon dioxide exhaust from the catalyst regenerator and removing methane and hydrogen from the wet gas stream leaving the main fractionator overhead receiver prior to its introduction into a wet gas compressor system. Nitrogen is removed from the exhaust gas and methane and hydrogen are removed from the wet gas in the same pressure swing adsorption (PSA) plant. During air replacement, exhaust gas is processed in the PSA plant and when the desired amount of nitrogen is removed from the exhaust gas, feed of exhaust gas to the PSA plant is terminated and flow of wet gas to the PSA plant is initiated.

18 Claims, 1 Drawing Sheet

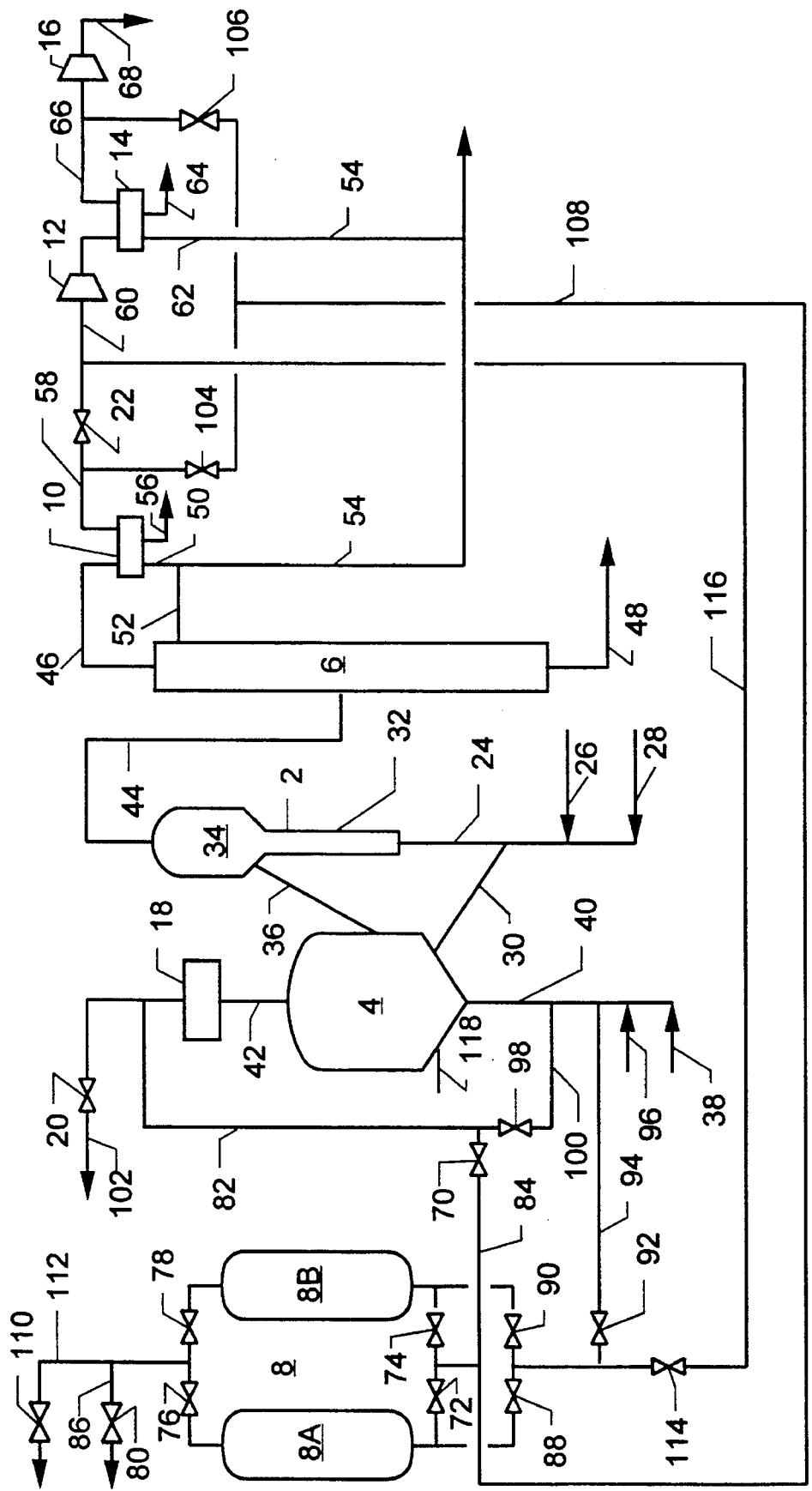
FIGURE

HYDROCARBON CATALYTIC CRACKING PROCESS

FIELD OF THE INVENTION

This invention relates to fluid catalytic cracking of hydrocarbons and more particularly to a method of increasing the throughput of hydrocarbon feed in fluid catalytic cracking processes.

BACKGROUND OF THE INVENTION

Refinery cracking processes serve to upgrade the heavier portions of petroleum to large volumes of lighter, more valuable hydrocarbon products. The cracking process is performed catalytically or thermally, the particular method depending on the type of petroleum feedstock being processed. The older thermal cracking processes, which include delayed cokers and flexicokers, is used to process heavy petroleum fractions, while the newer catalytic cracking process, which has developed into one of the most important petroleum refining processes, is used to crack lighter petroleum fractions, such as vacuum gas oil. The dominant catalytic cracking process in use today is the fluid catalytic cracking (FCC) process.

In FCC processes a mixture of hydrocarbon feedstock and steam is injected into a section of a hydrocarbon reactor unit referred to as the riser, where it contacts hot regenerated catalyst. Operating temperatures in the riser-reactor are typically in the range of about 450° to about 575° C. Cracking reactions begin immediately, producing an array of lower boiling hydrocarbons. The catalyst and cracked hydrocarbon vapors are carried up the riser into the catalyst-vapor disengagement section. Hydrocarbon condensation reactions also occur in the riser, with the result that coke is produced and deposited on the active sites of the catalyst. This substantially reduces the catalyst activity and selectivity.

The cracked hydrocarbon vapors and coked catalyst are separated in the reactor disengagement section. The separated catalyst drops by gravity into the stripping section of the unit, where hydrocarbons entrained with the catalyst are separated therefrom by means of stripping steam. The catalyst-free hydrocarbon vapors leave the reactor unit through the cracked product transfer line, and are conveyed to the main column for fractionation.

The cracked hydrocarbons enter the main column, where they are separated into one or more liquid streams and an overhead vapor stream. The overhead vapor stream, which consists of light gasoline and $C_4$ and lighter hydrocarbons, hydrogen and perhaps light inert gases, such as nitrogen, is cooled and discharged into the overhead accumulator vessel, where it undergoes flash separation to yield two hydrocarbon streams: a vapor stream, comprised substantially of $C_4$ and lighter hydrocarbons and hydrogen, and a liquid stream comprised of $C_5$ and heavier hydrocarbons, typically called unstabilized gasoline.

The overhead accumulator vapor stream, typically referred to as wet gas, is subsequently compressed for downstream fractionation steps. The compression is usually conducted in a train of compressors comprising two stages of compression, with interstage condensation and removal of additional unstabilized gasoline. The compressed stream is sent to a high pressure receiver vessel, from which a gaseous stream and a liquid stream are separated. The gaseous stream, referred to as high pressure gas and comprised mostly of $C_2^-$ hydrocarbons and hydrogen, is sent to a series of absorbers and distillation columns for recovery of the various components of this stream. The liquid stream from the high pressure receiver is likewise subjected to downstream processing steps for recovery of its components.

The stripped catalyst from the disengagement section of the cracking reactor flows into the catalyst regenerator. A controlled amount of air is blown into this vessel to rejuvenate the catalyst by combusting the coke on the catalyst, which is maintained in a fluidized state in the regenerator. The coke combustion reactions are highly exothermic accordingly the catalyst becomes very hot, e.g. its temperature after regeneration is generally in the range of about 560° to about 800° C. Regenerated catalyst is carried out of the regenerator through the regenerated catalyst standpipe and is introduced into the reactor riser, thereby completing the catalyst cycle.

The rate of catalyst flow to the riser is typically controlled by a slide-valve in the regenerated catalyst standpipe. Steady flow of catalyst through this valve is maintained by maintaining a steady residual pressure drop across the valve. For this purpose, it is essential that the regenerator pressure be maintained at a pressure higher than the reactor vessel pressure. Thus, the minimum pressure in the catalyst regenerator can be determined by the pressure in the cracking reactor.

The demand for refined hydrocarbon products has increased the incentive to maximize the amount of throughput or conversion in refinery FCC systems. Operation at higher FCC throughput or conversion increases wet-gas production, which in turn, increases production of valuable light hydrocarbons. The ability to increase FCC hydrocarbon throughput or conversion is very often limited by one or more of: (i) wet-gas compression capacity, (ii) regenerator coke burning capacity, and (iii) the ability to circulate catalyst by maintenance of required pressure drop across critical elements of the system.

Wet-gas compressor throughput can be enhanced by operating with a higher compressor inlet suction pressure, which can be attained by increasing the overhead accumulator pressure. For instance, increasing the overhead accumulator pressure by 1 psi can increase wet-gas compressor capacity by up to about 4%. However, the pressure in the overhead accumulator controls the upstream pressure, i.e. the pressure in the main column and the hydrocarbon riser-reactor. Increasing the overhead accumulator pressure would cause an increase in riser-reactor pressure, which is undesirable from a cracking perspective, because higher cracking reaction pressures enhance the selectivity of the coke-forming condensation reaction at the, expense of the desirable cracking reactions. Furthermore, the riser-reactor can encounter a catalyst circulation limit and flow reversal, unless the catalyst regenerator pressure is also correspondingly increased. Increasing the regenerator pressure is undesirable because this increases the air blower discharge pressure, which reduces its output.

Wet-gas compressor throughput can also be increased by lowering the compressor discharge pressure. This is likewise undesirable because the corresponding lower deethanizer-absorber pressure causes propylene to be lost to fuel gas. Quantitatively, lowering the absorber pressure by 20 psi could increase gas compressor throughput by 5%, but it also results in a 1.5% reduction in propylene recovery.

In addition to increasing wet-gas production, operation at higher throughput or conversion increases coke production rate, which tends to push units to their limiting ability to regenerate spent catalyst. The actual limit can be due to the limiting amount of air which the air blower can discharge. Some relief from an air-blower limit may be obtained by lowering the regenerator pressure, which enables the blower to discharge more moles of oxygen (in the form of air or oxygen plus inert diluent). The increased amount of oxygen availability allows the combustion of a larger amount of coke, which also releases more heat energy in the regenerator. The increased heat release and coke burning capacity can be taken advantage of by increasing the feed rate to the riser-reactor, and allowing the unit to establish a different heat and coke balance. However, lowering the regenerator pressure at constant riser pressure, could also lead to a catalyst circulation limit and flow reversal. A catalyst circulation limit may also be directly encountered due to the higher catalyst circulation rate required to process higher throughput at constant conversion.. From the above discussion, it is clear that the major constraints on an FCC unit are all strongly interrelated, and operational moves made to obtain relief from any one constraint may push the unit towards another constraint.

The load on the wet-gas compressor system would be considerably lessened if the light components could be removed from the wet-gas. This would permit a reduction in overhead accumulator pressure, which would, in turn, increase hydrocarbon throughput and conversion in the cracking reactor. It would be very advantageous to reduce the volume of wet gas that must be handled by the wet gas compressors by diverting .all or a portion of the compressor feed gas to an adsorption system comprised of one or more adsorption beds containing adsorbent(s) that adsorb $C_2$ and higher hydrocarbons more strongly than they adsorb methane and hydrogen. Methane and hydrogen and any other light inert gases that are present in the wet gas, such as nitrogen and argon, can then pass through the adsorption beds as nonadsorbed component and be sent to refinery fuel, or otherwise disposed of, while the adsorbed gas component, comprised of hydrocarbons higher than methane is desorbed from the adsorbent and sent to the wet gas compressors, where it is compressed and sent to downstream hydrocarbon separation units.

It is known to burn coke off FCC spent catalyst in catalyst regenerator by contacting the catalyst with a mixture of oxygen and carbon dioxide. It would be very advantageous to gradually replace the air in air-operated catalyst regenerators with oxygen-carbon dioxide mixture by passing the regenerator exhaust gas, which is rich in nitrogen and carbon dioxide, through a pressure swing adsorption system to remove the nitrogen, and then introduce the carbon dioxide to the regenerator with oxygen. This procedure would only require the use of the adsorption system for a short while, and unless another use were found for the adsorption system, it would sit idle until the next time it is needed for this purpose, i.e. after the next FCC plant turnaround. It would be very advantageous to use the adsorption system in a manner that would enhance the overall efficiency of the FCC operation. This invention provides a means of achieving this, and also enables the operator to make operational moves that would debottleneck other constraints on the unit.

SUMMARY OF THE INVENTION

The process of the invention is carried out in two stages. During the first stage, a fuel is burned in a cracking catalyst regenerator containing a hydrocarbon cracking catalyst, thereby producing exhaust gas comprising carbon dioxide and nitrogen. At the beginning of the first stage air is introduced into the regenerator as oxidant, and during this stage some or all of the air feed to the cracking catalyst regenerator is replaced by oxygen and carbon dioxide. The air replacement is accomplished by passing the nitrogen- and carbon dioxide- containing exhaust gas from the regenerator through a pressure swing adsorption (PSA) plant containing an adsorbent which adsorbs carbon dioxide more strongly than it adsorbs nitrogen, thereby separating nitrogen-rich gas as nonadsorbed fraction and carbon dioxide-rich gas as sorbate. The adsorbent can also adsorb $C_2$ and higher hydrocarbons more strongly than it adsorbs methane and hydrogen. During bed regeneration the carbon dioxide is desorbed and returned to the regenerator as a replacement for nitrogen. Meanwhile, substantially pure oxygen is introduced into the regenerator and air flow to the regenerator is reduced and, in the preferred embodiment, eventually terminated. When most of the nitrogen has been replaced by carbon dioxide, it is no longer necessary to pass the exhaust gas through the adsorption plant. The nitrogen concentration in the regenerator system can be controlled by venting some of the exhaust gas from the system with excess carbon dioxide.

As cracking catalyst regeneration proceeds, hot regenerated catalyst is transported to the hydrocarbon cracking reactor. As the catalyst enters the riser section of the reactor, it contacts hydrocarbon feed that is also being introduced into the reactor through the reactor riser. The hydrocarbon undergoes cracking upon contact with the hot catalyst, thereby producing a gaseous hydrocarbon stream comprising one or more hydrocarbons lower in molecular weight than said hydrocarbon feed and depositing coke on said catalyst. The coked catalyst is recycled to the regenerator for regeneration, and the cracked hydrocarbon stream is sent to the main column, where it is distilled into overhead gas stream and one or more liquid streams. The overhead gas stream is cooled and separated into a $C_5$ and higher hydrocarbon-containing liquid stream and a wet gas stream comprised of $C_4$ and lighter hydrocarbons and hydrogen.

The second stage of the process can begin at any time after termination of passage of catalyst regenerator exhaust gas through the PSA plant. During the second stage at least part of the wet gas stream is sent to the PSA plant for separation of a nonadsorbed gas fraction comprised of methane and hydrogen and an adsorbed gas fraction comprised of $C_2$ and higher hydrocarbons. The $C_2$ and higher fraction is desorbed from the adsorbent, compressed and transported to downstream hydrocarbon processing units for further refining of the components.

The fuel used during the first phase can be the coke deposits on the catalyst, or it can be a hydrocarbonaceous fluid, i.e. a liquid or gaseous hydrocarbon, such as fuel oil or natural gas. In a preferred embodiment, the fuel is fuel oil.

The catalyst may be fresh or regenerated catalyst or it may be equilibrium catalyst, i.e. catalyst from the current or a previous run.

The adsorbent is typically a natural zeolite or synthetic zeolite, such as chabazite, clinoptilolite, erionite, faujasite, mordenite, type X zeolites, type A zeolites, and type Y zeolites, silica gel, activated carbon, activated alumina, zeolite and mixtures of these. Preferred adsorbents include silica gel, activated carbon, activated alumina, synthetic zeolites, and mixtures of these. The adsorbent may be used by itself, however it can also be combined with a binder, such as a metal oxide, a clay, silica, alumina, etc. The adsorption separation may be performed in a single stage or multiple stages, which use the same or different adsorbents in each stage.

The adsorption step is generally carried out at temperatures in the range of about 0° to about 200° C., and preferably at temperatures in the range of about 15° to about 150° C. The adsorption step of the cycle is usually carried out at absolute pressures in the range of about 1 to about 10 bar, and is preferably carried out at absolute pressures in the range of about 2 to about 5 bar. The adsorbent regeneration step is carried out at an absolute pressure in the range of about 200 to about 3000 torr, and preferably at an absolute pressure in the range of about 200 to about 2000 torr.

The cracking catalyst regeneration step can be carried out under conditions that will produce an exhaust gas comprised substantially of carbon dioxide, i.e. it can be carried out in the presence of excess oxygen; or it may be carried out under conditions that result in the production of significant quantities of carbon monoxide.

The second stage of the process can be carried out with all or part of the wet gas stream being subjected to the pressure swing adsorption step. In the preferred embodiment all of the wet gas is subjected to pressure swing adsorption. Also part or all of the wet gas can be taken from a point intermediate the first and second compression stages of a two stage wet-gas compression step.

BRIEF DESCRIPTION OF THE DRAWING

The drawing figure is a schematic illustration of a hydrocarbon FCC plant comprising a hydrocarbon cracking reactor, a cracking catalyst regenerator, and a part of cracked catalyst recovery system

DETAILED DESCRIPTION OF THE INVENTION

The present invention can be used with advantage in any hydrocarbon cracking process in which a hydrocarbon is cracked in a reactor by means of a fluidized particulate catalyst, thereby depositing a coating of coke on the catalyst, and the catalyst is subsequently transferred in the fluidized state to a regenerator for removal of the coke deposits by combustion with air. Included in such processes are conventional FCC operations, fluid coking and flexicoking processes which use coke particles as the catalyst. For the sake of simplicity, however, the invention will be described in detail as it applies to an FCC process.

The appended Figure illustrates a typical FCC system equipped to handle each of the above-discussed embodiments of the invention. The system illustrated in the Figure includes, as principal units, an FCC riser type reactor, 2, a cracking catalyst regenerator, 4, a main hydrocarbon fractionator, 6, an adsorption system, 8, a main fractionator overhead accumulator, 10, a first stage compressor, 12, an interstage gas receiver, 14, a second stage compressor, 16 and a carbon monoxide reactor 18. All of the above-mentioned equipment units are conventional and details of their design, construction and operation are well known and form no part of the present invention. Various pipelines and valves have been included in the Figure as an aid to the explanation of the several aspects of the invention. Hydrocarbon processing and separation equipment and associated processing equipment, valves, heat exchangers, gages, etc., that are not directly related to the invention or which are not necessary for an understanding of the invention have been omitted from the Figure for the sake of simplicity.

In the conventional operation of the system illustrated in the Figure, valves 20 and 22 are open and all other valves are closed. A hydrocarbon feed stream, such as vacuum gas oil, and steam are introduced into reactor feed line 24 via lines 26 and 28, respectively. As the mixture passes upwardly in line 24 it mixes with hot regenerated cracking catalyst, which enters line 24 through regenerated catalyst transport line 30. The catalyst is fluidized by the rising hydrocarbon and steam vapors and the; fluidized mixture enters the bottom of the riser section 32 of reactor 2. The hydrocarbon rapidly cracks into lighter hydrocarbons as it moves upwardly through riser 32. During the course of the cracking reaction the catalyst becomes coated with coke, as a result of hydrocarbon condensation reactions that accompany cracking of the hydrocarbon. The cracked hydrocarbon-catalyst mixture enters disengagement section 34 of reactor 2, and enters a batter of cyclone separators (not shown) where catalyst is separated from the gas mixture. Subsequently, residual hydrocarbon entrained with the catalyst is removed by steam stripping. Spent catalyst passes out of reactor 2 through spent catalyst transport line 36 and flows to regenerator 4.

Upon entering regenerator 4, the hot coked catalyst contacts a stream of air introduced into regenerator 4 through line 38 and feed line 40. The coke deposits rapidly ignite and burn. Combustion of the coke can be conducted in the presence of excess oxygen, which results in the conversion of the coke to carbon dioxide, or it can be conducted in the presence of a stoichiometric deficit of oxygen, which results in the production of carbon monoxide and carbon-dioxide. Regenerated catalyst flows through regenerated catalyst transport line 30 to reactor feed line 24 to complete the catalyst cycle. The hot exhaust gases rise to the top of regenerator 4 and pass out of the regenerator through exhaust gas line 42. If the regenerator is operated under conditions that result in the production of carbon monoxide, the carbon monoxide can be oxidized to carbon dioxide in reactor 18. The exhaust gas, which is very hot, is also generally passed through waste heat recovery units (not shown) prior to being disposed of. In the illustrated system the exhaust gas leaves the regenerator system through valve 20.

The cracked hydrocarbon gas passes out of reactor 2 through product line 44 and is transported to main fractionator 6. As the hydrocarbon reactor effluent passes through fractionator 6, the more volatile components separate from the less volatile components, the lighter lower-boiling components rising towards the top of the column, and the heavier components descend towards the bottom of the column. At the top of the column a vapor stream comprised primarily of $C_5$ and lighter components is removed from the column 6 through overhead vapor line 46, and at the bottom of the column a heavy hydrocarbon stream is removed from the column through line 48. The bottoms product can be recycled as feed to reactor 2, or it may be sent to downstream units for further processing. Several intermediate sidestreams are also typically withdrawn from column 6, but these have no bearing on the invention, and thus are not shown in the Figure.

The overhead stream from column 6 is cooled and passed into overhead accumulator 10, where liquid and vapor components separate. Unstable gasoline is removed from the bottom of accumulator as a liquid through line 50. A portion of this stream is recycled to column 6 as reflux through reflux line 52, and the remainder is sent to downstream processing units via line 54 for further product recovery. A liquid sour water stream is removed from accumulator 10 through drain line 56.

A wet-gas stream comprised generally of $C_4$ and lighter components, but still containing small quantities of $C_5$ and heavier components, leaves accumulator 10 through line 58, passes through valve 22 and compressor feed line 60 and enters first stage wet-gas compressor 12. The wet-gas compressors are illustrated as comprising a pair of serially connected units, but it can be configured in other arrangements, such as parallel-series combinations. As the wet-gas undergoes compression, additional gasoline component and sour water are condensed. The first stage compressor liquid-gas effluent is sent to interstage receiver 14, from which gasoline and sour water are removed through lines 62 and 64, respectively. The interstage gasoline condensate is combined with the gasoline in line 54 and likewise sent to downstream processing units for further product separation. An intermediate pressure gas stream exits receiver 14 through line 66 and is subjected to further compression in second stage compressor 16. This high pressure gas stream exiting compressor 16, now comprised primarily of $C_4$ and lighter components, is sent to downstream units via line 68 for further separation of the various alkene and alkane components contained in this stream.

The first embodiment of the invention will be discussed as it applies to the illustrated system with the system in conventional operation as described above. In this embodiment, regenerator 4 is operated using air as the oxidant, and the exhaust gas is initially being discharged from the system through line 42 and waive 20. During the course of the process of this embodiment the air feed to regenerator 4 will be replaced by substantially pure oxygen and carbon dioxide. The carbon dioxide is provided by passing the exhaust gas from regenerator 4 through adsorption plant 8 to remove nitrogen and other weakly adsorbed gas components from the exhaust gas. The sorbate, which is enriched in carbon dioxide will be used as the carbon dioxide replacement gas.

Adsorption plant 8 may be comprised of a single adsorber or a batter of adsorbers arranged in parallel and/or in series. In preferred embodiments, the system comprises two or more adsorbers arranged in parallel and cycled out of phase to provide a pseudo continuous flow of nonadsorbed and desorbed gas streams. In the Figure, adsorption plant 8 is shown as being comprised of two adsorption vessels, 8A and 8B, which are arranged in parallel and designed to be operated in alternate adsorption-desorption service.

The adsorption system is operated in a pressure swing adsorption (PSA) mode. Pressure swing adsorption is well known for separating the components of a mixture of gases by virtue of the difference in the degree of adsorption among them on a particulate adsorbent retained in a stationary bed. Typically, two or more such beds are operated in a cyclic process comprising adsorption under relatively high pressure and desorption or bed regeneration under relatively low pressure or vacuum. The cycle may contain steps other than the fundamental steps of adsorption and regeneration. For example, the cycle may include one or more bed pressure equalization steps, in which some of the gas contained in a first adsorption vessel which has just completed its adsorption step is transferred to a second adsorption vessel which has just completed its bed regeneration step. In this way the high pressure gas in the first vessel is used to partially pressurize the second bed, thus enhancing the efficiency of the process. The cycle may also include a product backfill step wherein the regenerated bed is partially pressurized, before or in lieu of the bed equalization step, by introducing nonadsorbed product gas into the bed in the countercurrent direction, i.e. in the direction opposite to the direction that fresh feed in passed through the bed. The design and operation of PSA units is well known and details concerning such forms no part of the invention.

The adsorption can be carried out using any adsorbent or mixture of adsorbents that selectively adsorb carbon dioxide from mixtures of carbon dioxide and nitrogen and that selectively adsorb $C_2$ and higher hydrocarbons from a gas mixture containing these hydrocarbons, methane, and hydrogen, and possibly also containing light permanent gases, such as nitrogen and argon. Suitable adsorbents include molecular sieves, activated carbons, activated clays, silica gels, activated aluminas, etc. Molecular sieves include aluminophosphates, silicoaluminophosphates, and zeolites. Typical zeolites include natural zeolites, such as chabazite, clinoptilolite, erionite, faujasite, mordenite, etc., and synthetic zeolites, such as type X zeolites, type A zeolites, and type Y zeolites. Preferred adsorbents include silica gel, activated carbon, activated alumina, zeolite molecular sieves and mixtures of these.

When the adsorbent is a molecular sieve, it is often desirable to combine it with a binder. Any natural or synthetic binder material or mixture of materials can be used as binder for the adsorbent. Typical binders include metal oxides, clays, silicas, aluminas, etc. Suitable clay binders include kaolin, bentonite, montmorillonite, attapulgite, etc. The choice of binder and methods of agglomerating the adsorbent and binder are well known to those skilled in the, art and form no part of the invention.

The adsorption process is generally carried out at temperatures in the range of about 0° to about 200° C., and preferably at temperatures in the range of about 15° to about 150° C. The adsorption step of the cycle is usually carried out at absolute pressures in the range of about 1 to about 10 bar, and is preferably carried out at absolute pressures in the range of about 2 to about 5 bar.

The adsorbent regeneration step of the cycle is generally carried out at an absolute pressure of about 200 to about 3000 torr, and is preferably carried out at an absolute pressure in the range of about 200 to about 2000 torr. The adsorbent can be regenerated by a number of techniques. In one procedure, the adsorbent is regenerated by venting the bed back to the compressor feed line until the pressure in the bed reaches about atmospheric pressure. If desired the adsorbent can be further regenerated by evacuation using a vacuum means, such as a vacuum pump or an ejector. By this means the pressure in the bed can be reduced to 200 mm absolute, ,or lower. The adsorbent can also be purged with a gas, such as the nonadsorbed fraction. Combinations of venting, vacuum evacuation and purging can also be used for adsorbent regeneration. If it is desired to maximize the amount of hydrocarbon recovered in each cycle, all three of these recovery procedures can be used.

Air replacement can be initiated with either adsorber 8A or adsorber 88 in adsorber service. In the following discussion, initial operation of adsorption plant 8 will be described with adsorption unit 8A in adsorption service. During this phase valve 22 will remain open, valves 70, 72, 76 and 86 will be opened, and all other valves will be in the closed position.

The exhaust gas leaves regenerator 4 through line 42, is conducted through line 82, valve 70, line 84, valve 72 and into adsorber 8A. Prior to being introduced into the adsorber the exhaust gas is pressurized to a pressure generally in the range of about 2 to about 20 atmospheres. Carbon dioxide is adsorbed from the gas as it moves through the bed of adsorbent in adsorber 8A, while nitrogen and any oxygen present pass through the adsorbent and leave the adsorption plant through valves 76 and 86 and line 112. As the adsorption proceeds, the carbon dioxide adsorption front progresses through vessel 8A toward the nonadsorbed gas outlet end. When the adsorbed gas front reaches the desired point in adsorber 8A, the adsorption step is terminated and the adsorption cycle moves into its second phase, in which vessel 8B is put into adsorption service and vessel 8A undergoes regeneration.

In this phase of the operation valves 22 and 70 remain open, valves 74, 78, 80, 88 and 92 are opened and all other valves are closed. Exhaust gas now enters vessel 8B wherein carbon dioxide is absorbed from the gas and nitrogen passes to vent through valve 78 and line 86, as described above. Meanwhile, vessel 8A is depressurized by flow of gas out through valve 88. The desorbed gas, now rich in carbon dioxide, passes through valve 92 and line 94 and enters regenerator 4 through feed line 40. If desired, depressurization of vessel 8A may be assisted by means of a vacuum pump (not shown). When vessel 8A is depleted of carbon dioxide to the desired extent, and when the carbon dioxide adsorption front in vessel 8B reaches the desired point, the second phase of the adsorption process is completed and the cycle is repeated with vessel 8A in adsorption service and vessel 8B undergoing regeneration.

As the air replacement procedure progresses, the concentration of carbon dioxide in regenerator 4 begins to build up. To maintain the oxygen to inert diluent ratio and the total amount of oxygen entering regenerator 4 at the desired levels, it is necessary to begin introducing oxygen into regenerator 4 through line 96 and to reduce the flow of air into this unit through line 38. The air replacement procedure is continued until the desired air to added oxygen and carbon dioxide ratio is attained, or until all of the air feed is replaced with oxygen and recycle carbon dioxide, whichever procedure is preferred. If complete air replacement is preferred all air flow through line 38 is terminated.

Upon completion of the air replacement step, use of adsorption plant 8 for removal of nitrogen from the exhaust gas is no longer necessary. At this point valves 70 and 92 are closed and valve 98 in bypass line 100 is opened. Flow of exhaust gas is now directly recycled to regenerator 4. Additionally in this embodiment, to prevent excessive buildup of carbon dioxide in regenerator 2, valve 20 is opened sufficiently to maintain the carbon dioxide level in the system at the desired level. Excess carbon dioxide then passes out of the system through valve 20 in line 102. Opening valve 20 serves the additional purpose of preventing the buildup of nitrogen and gaseous impurities, such as argon, sulfur oxides and nitrogen oxides, in the system. The gas stream leaving the system through valve 20 may be vented to the atmosphere or, if it contains gaseous components that are harmful to the environment, it may be sent to downstream purification units for removal of the harmful components.

The second stage of the invention can be initiated at any time after completion of the air replacement stage. During the second stage of the process of the invention, regenerator 4 is operated with recycle of exhaust gas through line 82. Accordingly, valves 20 and 98 remain open and valves 70 and 92 remain closed.

The second stage has a number of alternative embodiments. Practice of the first embodiment will be described with adsorber 8A initially in adsorption service. In this mode, valves 72, 76, 104 and 110 are initially open and valves 22, 74, 78, 80, 88, 90, 106 and 114 116 are initially closed. Wet-gas is now diverted to adsorption system 8 through valve 104 and line 108. The wet-gas approaching adsorption system 8 may contain a considerable amount of moisture. Since moisture is usually rapidly adsorbed by most adsorbents, it is preferable to dry the gas prior to admitting it to the adsorption beds. This can be accomplished by passing the gas through a desiccant, such as silica gel or alumina. Even though the desiccant may also adsorb some of the hydrocarbon in the wet-gas feed, water will be more strongly adsorbed by the adsorbent; hence the adsorbed hydrocarbon will be displaced by the moisture entering the desiccant.

As the wet-gas passes through adsorber 8A, $C_2$ and higher hydrocarbons are adsorbed, and methane anti hydrogen pass through the beds as nonadsorbed gas and exit system 8 through valves 76 and 110 and line 112. The nonadsorbed gas stream is then sent to refinery fuel, or is otherwise disposed of. When the adsorbed component reaches the desired endpoint in the adsorption vessel the adsorption step is terminated and the adsorbent is regenerated to recover the adsorbed gas fraction. During this phase of the adsorption cycle, valves 74, 78, 88 and 114 are opened, valves 72 and 76 are closed and valve 90 remains closed. Adsorber 8A now undergoes regeneration, as described above. The desorbed gas leaves adsorption system 8 through valves 88 and 114, and is returned to first stage compressor feed line 60 via line 116. Upon completion of regeneration of adsorber 8A, the second adsorption cycle is begun with bed 8A initially in adsorption service and bed initially 8B undergoing regeneration. The adsorption cycle is basically the same as the cycle described above for removal of nitrogen from the exhaust gas.

The procedure of the first embodiment enables compressors 12 and 16 to handle additional amounts of hydrocarbon, since the volume of the wet gas has been significantly reduced by removal of considerable amounts of methane and hydrogen from this stream. The increased molecular weight of the stream also enables ease of compression. This procedure may also be used to reduce the pressure in the system upstream of adsorption system 8, if the adsorption system is designed to remove wet gas from line 68 quickly enough to cause a pressure reduction in this line.

In the second embodiment of the invention, valves 22, 104, 110 and 114 are open, valves 80 and 106 are closed and the position of the valves associated with adsorption plant 8 depends on which adsorber is in adsorption service. This embodiment is similar to the first embodiment, except that the system has the additional advantage that the reduced pressure in line 60 which results from the passage of part of the wet-gas through adsorption system 8 is reflected all the way back to catalyst regenerator 4, In this embodiment, flow through lines 60 and 108 is adjusted to the desired rates by regulation of the openings in valves 22 and 104.

In the third embodiment, valves 22 and 106 are open, valve 104 is closed and the position of the valves associated with adsorption plant 8 depends on which adsorber is in adsorption service. In this case, all of the wet gas in line 58 passes through first stage compressor 12, and intermediate pressure gas from line 66 passes through valve 106 and line 108 and into adsorption system 8, and desorbed gas is returned to first stage compressor 12 via feed line 60. The advantage of this embodiment is that the gas stream in line 66 is substantially free of water; accordingly it is not necessary to include a desiccant bed in adsorption system 8. This gas stream is also substantially free of $C_5$ and higher hydrocarbons. This embodiment also increases the throughput of compressor 12 by reducing the pressure on the discharge side of this compressor, and results in a reduction of pressure in the upstream units because valve 22 is open. Depending on the extent valve 106 is opened, the load to be handled by compressor 16 is reduced. The molecular weight for the gas handled by both compressors is increased by this option because the lightest components are rejected from the system through line 68.

In a fourth embodiment of the invention, valves 22, 104 and 106 are open and the position of the valves associated with adsorption plant 8 depends on which adsorber is in adsorption service. In this case part of the wet-gas in line 58 passes through adsorption system 8 by virtue of open valve 104. Additionally, part of the intermediate pressure gas stream in line 66 passes through adsorption system 8 through open valve 106. This embodiment has the advantage that the feed pressure to both compressors 12 and 16 is reduced since some methane and hydrogen are removed from the wet-gas before it reaches compressor 12, and the remainder is removed from intermediate pressure gas line 66. This embodiment also enjoys the advantage that since the pressure in line 60 is reduced and valve 22 is open, the pressure throughout the system upstream of compressor 12, including the pressure in regenerator 4, will be reduced.

It can be appreciated that variations of the above-described procedures are contemplated. For example, the entire system may be undergoing startup after a plant turnaround. In this case, regenerator 4 may contain fresh catalyst: or equilibrium catalyst, i.e. catalyst from an earlier run, which may be regenerated or coked catalyst. A mixture of fuel and air is combusted in regenerator 4 to initiate combustion of the coke (when the catalyst is coked) and/or to heat the catalyst to its normal operating temperature; and to begin producing carbon dioxide. The fuel which can be in fluid form, i.e. a liquid or a gas, but is preferably fuel oil, is introduced into regenerator 4 through line 25, and air is provided through lines 38. The air-fuel mixture is burned in reactor 4. As the fuel burns, the temperature of the catalyst in reactor 4 rises, and an exhaust gas usually comprised mostly of carbon dioxide and nitrogen is produced. The exhaust gas is recycled to adsorption plant 8 for removal of nitrogen, and a carbon dioxide-enriched desorbate is recovered and sent to regenerator for use in replacement of air with an oxygen-carbon dioxide combination, as described above.

When the cracking catalyst being heated in regenerator 4 reaches the temperature at which it is ready for use in the hydrocarbon cracking process to be performed in reactor 2, the hydrocarbon cracking process can be started in reactor 2. Startup of the overall system is initiated by opening a slide valve (not shown) in line 30, which permits the hot catalyst to move downwardly through line 30 and into line 24. As the catalyst enters line 24 it is fluidized and carried upwardly into reactor 2 by the steam entering line 24 from line 28. Simultaneously with the introduction of catalyst into reactor 2, or after the catalyst flow is stabilized, hydrocarbon feed is introduced into line 24 through line 26. After flow of wet gas is establish in line 58, the second stage of the process of the invention, i.e. removal of methane and hydrogen from the wet-gas can be carried out in the manner described above.

It will be appreciated that it is within the scope of the present invention to utilize conventional equipment to monitor and automatically regulate the flow of gases within the system so that it can be fully automated to run continuously in an efficient manner.

The invention is further illustrated by the following example in which, unless otherwise indicated, parts, percentages and ratios are on a volume basis. The example illustrates the process of the invention as it applies to the catalytic cracking of a gas oil.

EXAMPLE

In this hypothetical example, an FCC unit is started up using an adsorption system to remove nitrogen from the exhaust gas stream of the catalyst regenerator. The remaining gas stream, comprised substantially of carbon dioxide, is recycled to the regenerator. As the concentration of carbon dioxide in the regenerator builds up, air flow to the regenerator is reduced and oxygen flow is increased. When the air is completely replaced, the adsorption system is then used to remove light gas from the wet gas stream from the main fractionator overhead accumulator.

Summarized in Table I are the results of the simulation for the first step of the example, i.e. replacement of air with oxygen and carbon dioxide. In the first step, the process is started using air. The pressure-swing adsorption system of the invention is operated until the recycle gas is substantially comprised of carbon-dioxide. The adsorbent is silica gel, the adsorption temperature is 75° C., the adsorption pressure is 12 psig and the desorption pressure is 400 millibar. The adsorption and bed regeneration steps of the cycle are each 2 minutes.

TABLE I

| | |
|---|---|
| Total Regeneration Gas Rate, MSCFM | 225 |
| Total Oxygen Rate, MSCFM | 63.6 |
| Oxygen Level, v % | 28.3 |
| Flue Gas Oxygen, v % | 2.0 |
| Reactor Temp, °C. | 527 |
| Regenerator Bed Temp, °C. | 711 |
| FCC Feed Rate, MBBL/D | 135 |
| Coke Yield, wt % | 5.2 |

In the second part of this hypothetical example, operation of the adsorption plant for removal of light components of the wet gas is projected. The run is simulated for operation in the practice of the first embodiment described above, i.e. where the entire wet gas stream is processed in a PSA system prior to being compressed in the wet gas compressors. The flow rates of the streams of interest are listed in Table II, using a basis a feed stream of 100 MMSCF/D, the composition of which is likewise set forth in Table II. All flow rates are expressed in MMSCF/D (million standard cubic feed per day)

The separation in this part of the hypothetical example consists of two stages. The $C_5$ and heavier hydrocarbons are removed in a first stage adsorption plant by pressure swing adsorption using a bed containing de-aluminated zeolite Y catalyst. The nonadsorbed pressure product from the first stage plant is then sent to a second stage adsorption plant that contains silica-gel. The pressure during the adsorption step of the first and second stages is projected to be 17.5 and 16 psig, respectively, and during the vacuum regeneration step of each of the first and second stages is projected to be 400 millibar. The sorbate from the second stage is sent to the first-stage of a wet-gas compression plant, after its pressure and temperature have been appropriately adjusted.

TABLE II

| Component | Gas to Separator | Gas to Compressor | Reject Gas |
|---|---|---|---|
| Hydrogen | 17.0 | 2.5 | 14.5 |
| Methane | 21.0 | 3.2 | 17.8 |
| Carbon Monoxide | 0.5 | 0.1 | 0.4 |
| Carbon Dioxide | 1.5 | 1.3 | 0.2 |
| Nitrogen | 5.0 | 0.8 | 4.2 |
| Hydrogen Sulfide | 0.4 | 0.35 | 0.05 |

TABLE II-continued

| Component | Gas to Separator | Gas to Compressor | Reject Gas |
|---|---|---|---|
| Ethylene | 7.0 | 6.0 | 1.0 |
| Ethane | 6.0 | 5.2 | 0.8 |
| Propylene | 12.0 | 11.0 | 1.0 |
| Propane | 3.5 | 3.2 | 0.3 |
| Butylenes | 11.0 | 10.0 | 1.0 |
| Normal Butane | 2.0 | 1.8 | 0.2 |
| Isobutane | 5.0 | 4.5 | 0.5 |
| $C_5+$ | 8.1 | 1.2 | 6.9 |
| TOTAL | 100 | 51.15 | 48.85 |
| AVG. MOLECULAR WT. | 32.3 | 40.8 | 23.4 |

As can be seen from the table, the amount of gas to be compressed is significantly reduced, from 100 to about 51 MMSCF/D. An advantage of the invention, as illustrated in Table II, is the higher molecular weight of the product gas for compression. If a higher recovery level of the $C_2$ and heavier hydrocarbons is desired, the nonadsorbed gas is subjected to further adsorptive separation stages.

Although the invention has been described with particular reference to specific embodiments., these are merely exemplary of the invention, and variations are contemplated. For example, the process of the invention may be practiced in equipment arrangements other than those illustrated in the drawing. Furthermore procedures other than those described above can be employed in the invention. For example, it may be desirable to alternately operate adsorption system 8 in carbon dioxide enrichment and wet-gas enrichment service. It may also be desirable to provide wet gas and carbon dioxide-rich gas storage pending their use or processing in the system during various phases of the process of the invention. The scope of the invention is limited only by the breadth of the appended claims.

What is claimed is:

1. A hydrocarbon fluid catalytic cracking process comprising the steps:
    (a) establishing hydrocarbon cracking catalyst regeneration by:
        (1) combusting fuel with air in a catalyst regeneration zone containing hydrocarbon cracking catalyst, thereby heating said catalyst and producing exhaust gas comprising carbon dioxide and nitrogen;
        (2) subjecting said exhaust gas to a pressure swing adsorption process in an adsorption zone containing a bed of adsorbent which more strongly adsorbs carbon dioxide than nitrogen and which more strongly adsorbs $C_2$ and higher hydrocarbons than methane and hydrogen, thereby producing carbon dioxide-enriched gas;
        (3) at least partially replacing said air with oxygen and said carbon dioxide-enriched gas;
        (4) when air replacement to the desired extent is attained, stopping the flow of exhaust gas to said adsorption zone and recycling exhaust gas directly to said regenerator zone;
    (b) contacting hydrocarbon feed in a reaction zone with hot catalyst transported from said regeneration zone, thereby producing a gaseous hydrocarbon stream comprising one or more hydrocarbons lower in molecular weight than said hydrocarbon feed and depositing coke on said catalyst;
    (c) transporting coked catalyst from said reaction zone to said catalyst regenerating zone;
    (d) distilling said gaseous hydrocarbon stream, thereby producing an overhead gas stream and one or more liquid streams;
    (e) cooling said overhead gas stream, thereby separating said gas stream into a $C_5$ and higher hydrocarbon-containing liquid stream and a wet gas stream comprised of $C_4$ and lighter hydrocarbons and hydrogen;
    (f) upon completion of step (a) subjecting at least part of said wet gas stream to a pressure swing adsorption process in said adsorption zone, thereby producing a nonadsorbed fraction comprised of methane and hydrogen and an adsorbed fraction comprised of $C_2$ and higher hydrocarbons;
    (g) desorbing said adsorbed fraction from said adsorption zone;
    (h) compressing the desorbed fraction; and
    (i) transporting compressed desorbed fraction to downstream hydrocarbon processing units.

2. The process of claim 1, wherein said fuel is a hydrocarbonaceous fluid.

3. The process of claim 2, wherein said fuel is fuel oil.

4. The process of claim 2, wherein the catalyst used in step (a) (1) is fresh catalyst.

5. The process of claim 1, wherein the catalyst used in step (a) (1) is equilibrium catalyst and said fuel is coke deposits on the surfaces of said catalyst.

6. The process of claim 1, wherein the adsorption step of each pressure swing adsorption process is carried out at an absolute pressure in the range of about 2 to about 5 bar.

7. The process of claim 1, wherein the adsorbent regeneration step of each pressure swing adsorption process is carried out at an absolute pressure in the range of about 200 to about 2000 torr.

8. The process of claim 1, wherein catalyst regeneration is carried out in the presence of a stoichiometric deficit of oxygen.

9. The process of claim 1, wherein part of said wet gas stream is subjected to said pressure swing adsorption step and part is combined with the desorbed fraction prior to step (h).

10. The process of claim 1, wherein substantially all of said wet gas stream is subjected to said pressure swing adsorption step.

11. The process of claim 1, wherein the compression of step (h) is carried out in two stages.

12. The process of claim 11, wherein at least part of the wet gas used in step (f) is taken from a point intermediate the first and second compression stages.

13. The process of claim 1, wherein at least part of said wet gas stream is compressed in a wet gas compressor and additional liquid $C_5$ and heavier hydrocarbon is removed therefrom, and part of the compressed and further $C_5$ hydrocarbon-depleted stream is subjected to steps (e) to (i).

14. The process of claim 13, wherein all of said wet gas stream is compressed in a wet gas compressor and additional liquid $C_5$ and heavier hydrocarbon hydrocarbon-containing component is removed therefrom, and part of the compressed and further $C_5$ and heavier hydrocarbon-depleted stream is subjected to steps (e) to (h).

15. The process of claim 1, wherein part of said wet gas stream is compressed in a wet gas compressor and additional liquid $C_5$ and heavier hydrocarbon-containing component is removed therefrom, and part of the compressed and further $C_5$ and heavier hydrocarbon-depleted stream is combined with wet gas stream that was not subjected to wet gas compression and further liquid $C_5$ and heavier hydrocarbon removal, and the combined stream is subjected to steps (c) to (i).

16. The process of claim 1, wherein said oxygen-containing gas mixture is air, an oxygen-nitrogen mixture an oxygen-carbon dioxide mixture or air-oxygen-carbon dioxide mixture.

17. The process of claim 1, wherein said adsorbent is selected from silica gel, activated carbon, activated alumina, zeolite molecular sieves and mixtures of these.

18. The process of claim 1, wherein said hydrocarbon feed is gas oil, residual fuel oil or mixture thereof.

* * * * *